United States Patent

Weder et al.

[11] Patent Number: 5,829,225
[45] Date of Patent: *Nov. 3, 1998

[54] METHOD OF COVERING A FLOWER POT WITH A SLEEVE

[75] Inventors: Donald E. Weder; Joseph G. Straeter, both of Highland; William F. Straeter, Breese, all of Ill.

[73] Assignee: Southpac Trust International, Inc.

[*] Notice: The term of this patent shall not extend beyond the expiration date of Pat. No. 5,361,482.

[21] Appl. No.: 764,479

[22] Filed: Dec. 12, 1996

Related U.S. Application Data

[63] Continuation-in-part of Ser. No. 608,390, Feb. 28, 1996, Pat. No. 5,628,146, which is a continuation of Ser. No. 457,186, Jun. 1, 1995, Pat. No. 5,572,849, which is a continuation of Ser. No. 386,859, Feb. 10, 1995, Pat. No. 5,493,809, which is a continuation-in-part of Ser. No. 237,078, May 3, 1994, Pat. No. 5,625,979, which is a continuation-in-part of Ser. No. 940,930, Sep. 4, 1992, Pat. No. 5,361,482.

[51] Int. Cl.$^6$ ............................. B65B 25/02; B65B 51/00
[52] U.S. Cl. .................................. 53/397; 53/412; 53/416; 53/592
[58] Field of Search ............................. 53/397, 416, 419, 53/412, 410, 390, 219, 218, 592; 206/423; 47/72

[56] References Cited

U.S. PATENT DOCUMENTS

| Re. 21,065 | 5/1939 | Copeman | 53/411 X |
|---|---|---|---|
| D. 335,105 | 4/1993 | Ottenwalder et al. | D11/164 |
| 524,219 | 8/1894 | Schmidt | 229/89 |

(List continued on next page.)

FOREIGN PATENT DOCUMENTS

| 4231978 | 6/1979 | Australia | 206/423 |
|---|---|---|---|
| 0050990 | 5/1982 | European Pat. Off. . | |
| 2036163 | 12/1970 | France . | |
| 2489126 | 3/1982 | France . | |
| 2610604 | 8/1988 | France . | |
| 345464 | 12/1921 | Germany | 53/464 |
| 513971 | 11/1930 | Germany | 47/72 |
| 1166692 | 3/1964 | Germany . | |
| 542958 | 2/1993 | Japan . | |
| 560532 | 4/1975 | Switzerland | 206/423 |
| 1204647 | 9/1970 | United Kingdom . | |
| 2074542 | 11/1981 | United Kingdom . | |
| 2128083 | 4/1984 | United Kingdom | 47/72 |
| 9315979 | 8/1993 | WIPO . | |

OTHER PUBLICATIONS

Exhibit A — Speed Cover Brochure, "The Simple Solution For Those Peak Volume Periods", Highland Supply Coproration, ©1989.

Exhibit B — "Speed Sheets and Speed Rolls" Brochure, Highland Supply Corporation, ©1990.

Exhibit C — "Color Them Happy with Highlander Products" ©1992.

Exhibit D — "Costa Keeps the Christmas Spirit", Supermarket Floral, Sep. 15, 1992.

Exhibit E — "Super Seller", Supermarket Floral, Sep. 15, 1992.

Exhibit F — "Halloween", Link Magazine, Sep. 1992, 2 pages.

Exhibit G — "Now More Than Ever", Supermarket Floral, Sep. 15, 1992.

(List continued on next page.)

*Primary Examiner*—James F. Coan
*Attorney, Agent, or Firm*—Dunlap &Codding, P.C.

[57] ABSTRACT

A sleeve used to wrap items such as potted plants. The sleeve may have an open or closed bottom. When closed, the bottom may have a gusset for allowing expansion upon the depositing of the pot into the sleeve. The sleeve has a detachable upper portion. The sleeve has a bonding material disposed upon an inner and/or outer portion of the sleeve for crimping the sleeve adjacent the pot to hold the sleeve about the pot.

13 Claims, 9 Drawing Sheets

U.S. PATENT DOCUMENTS

| | | | |
|---|---|---|---|
| 732,889 | 7/1903 | Paver . | |
| 950,785 | 3/1910 | Pene . | |
| 1,063,154 | 5/1913 | Bergen . | |
| 1,446,563 | 2/1923 | Hughes . | |
| 1,520,647 | 12/1924 | Hennigan . | |
| 1,525,015 | 2/1925 | Weeks | 53/461 X |
| 1,610,652 | 12/1926 | Bouchard . | |
| 1,697,751 | 1/1929 | Blake | 229/87 |
| 1,863,216 | 6/1932 | Wordingham . | |
| 1,978,631 | 10/1934 | Herrlinger | 91/68 |
| 2,048,123 | 7/1936 | Howard | 229/87.01 X |
| 2,170,147 | 8/1939 | Lane | 53/411 X |
| 2,278,673 | 4/1942 | Savada et al. | 154/43 |
| 2,302,259 | 11/1942 | Rothfuss | 150/52 R |
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,648,487 | 8/1953 | Linda | 229/55 |
| 2,774,187 | 12/1956 | Smithers | 47/41 |
| 2,822,287 | 2/1958 | Avery | 117/14 |
| 2,846,060 | 8/1958 | Yount | 53/461 X |
| 2,850,842 | 9/1958 | Eubank, Jr. | 47/58 |
| 2,883,262 | 4/1959 | Borin | 53/464 X |
| 2,989,828 | 6/1961 | Warp | 53/390 |
| 3,022,605 | 2/1962 | Reynolds | 47/58 |
| 3,094,810 | 6/1963 | Kalpin | 383/104 X |
| 3,121,647 | 2/1964 | Harris et al. | 118/202 |
| 3,130,113 | 4/1964 | Silman | 161/97 |
| 3,271,922 | 9/1966 | Wallerstein et al. | 53/390 X |
| 3,322,325 | 5/1967 | Bush | 229/62 |
| 3,376,666 | 4/1968 | Leonard | 47/41 |
| 3,380,646 | 4/1968 | Doyen et al. | 229/57 |
| 3,431,706 | 3/1969 | Stuck | 53/390 |
| 3,508,372 | 4/1970 | Wallerstein et al. | 53/3 |
| 3,552,059 | 1/1971 | Moore | 47/41.12 |
| 3,554,434 | 1/1971 | Anderson | 229/55 |
| 3,556,389 | 1/1971 | Gregoire | 229/53 |
| 3,557,516 | 1/1971 | Brandt | 53/14 |
| 3,620,366 | 11/1971 | Parkinson | 206/59 |
| 3,681,105 | 8/1972 | Milutin | 117/15 |
| 3,793,799 | 2/1974 | Howe | 53/32 |
| 3,869,828 | 3/1975 | Matsumoto | 47/34.11 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,113,100 | 9/1978 | Soja et al. | 206/602 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,297,811 | 11/1981 | Weder | 47/72 |
| 4,333,267 | 6/1982 | Witte | 47/84 |
| 4,347,686 | 9/1982 | Wood | 47/73 |
| 4,380,564 | 4/1983 | Cancio et al. | 428/167 |
| 4,400,910 | 8/1983 | Koudstall et al. | 47/84 |
| 4,413,725 | 11/1983 | Bruno et al. | 206/45.33 |
| 4,546,875 | 10/1985 | Zweber | 206/0.82 |
| 4,640,079 | 2/1987 | Stuck | 53/390 |
| 4,733,521 | 3/1988 | Weder et al. | 53/580 |
| 4,765,464 | 8/1988 | Ristvedt | 206/0.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,105,599 | 4/1992 | Weder | 53/399 |
| 5,111,638 | 5/1992 | Weder | 53/397 |
| 5,120,382 | 6/1992 | Weder | 156/212 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,259,106 | 11/1993 | Weder et al. | 29/469.5 |
| 5,315,782 | 5/1994 | Avôt et al. | 47/72 |
| 5,353,575 | 10/1994 | Stepanek | 53/461 |
| 5,361,482 | 11/1994 | Weder et al. | 53/397 X |
| 5,388,695 | 2/1995 | Gilbert | 206/423 |
| 5,496,251 | 3/1996 | Cheng | 493/224 |
| 5,634,320 | 6/1997 | Weder | 53/416 X |

OTHER PUBLICATIONS

Exhibit H — Le Plant Sac Advertisement, published prior to Sep. 26, 1987.

Exhibit I — "A World of Cut Flower and Pot Plant Packaging" Brochure, Klerk's Plastic Products Manufacturing, Inc., Date unknown, 6 pages.

Exhibit J — Chantler & Chantler brochure showing Zipper Sleeve™ and Florasheet®, Date unknown, 2 pages.

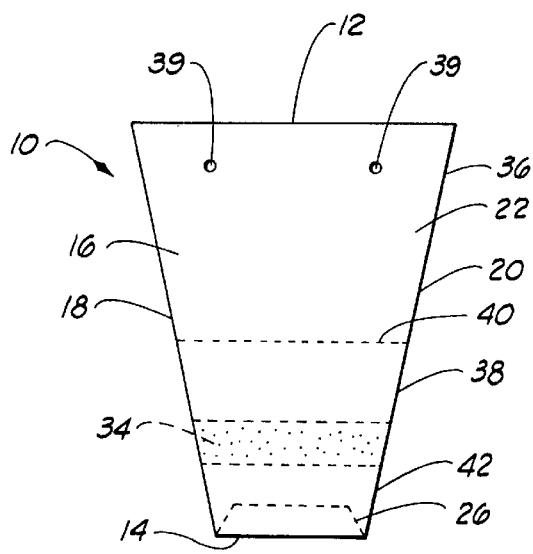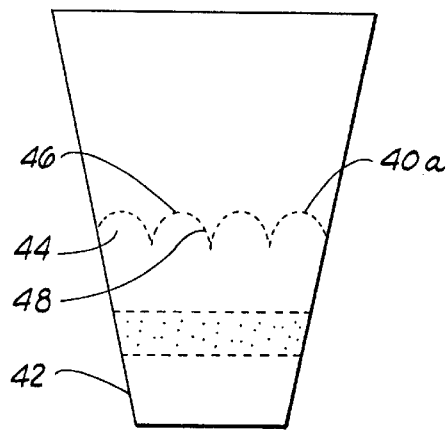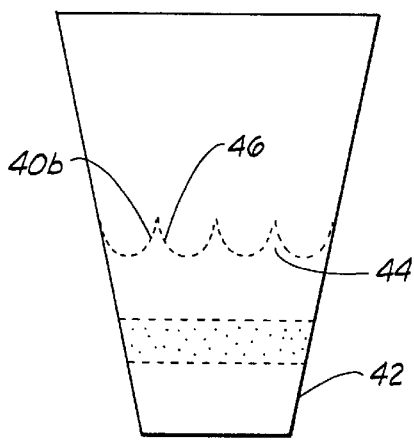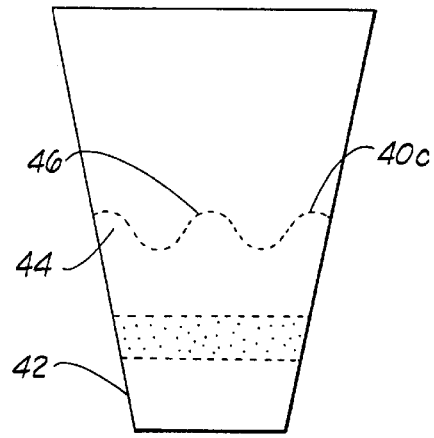

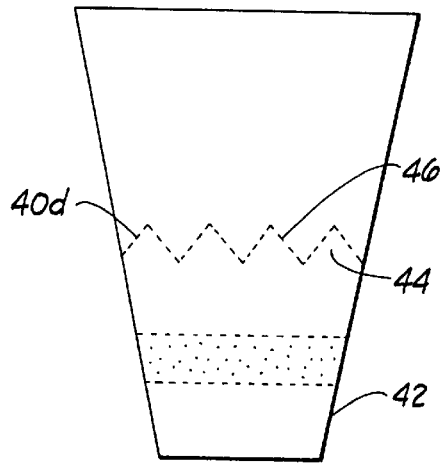
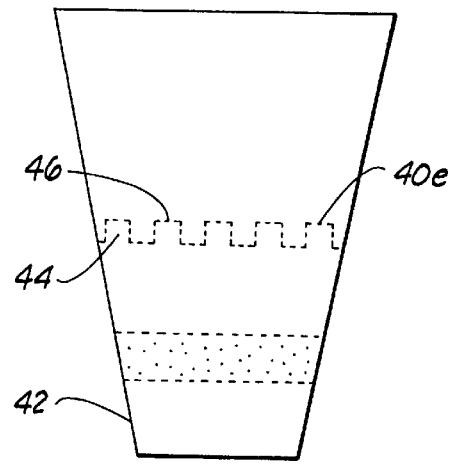
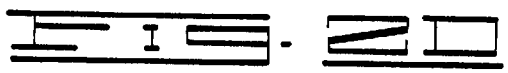
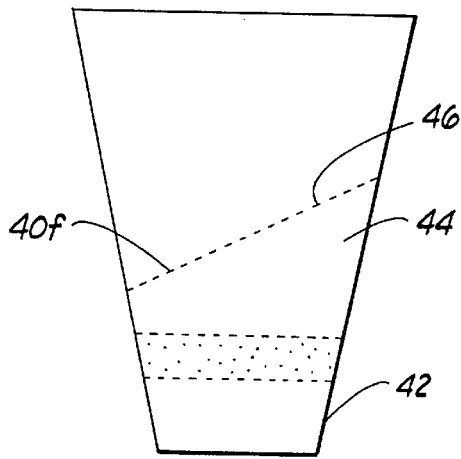
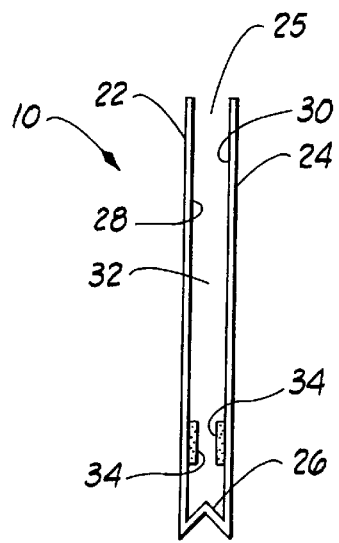
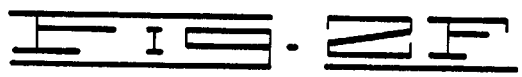

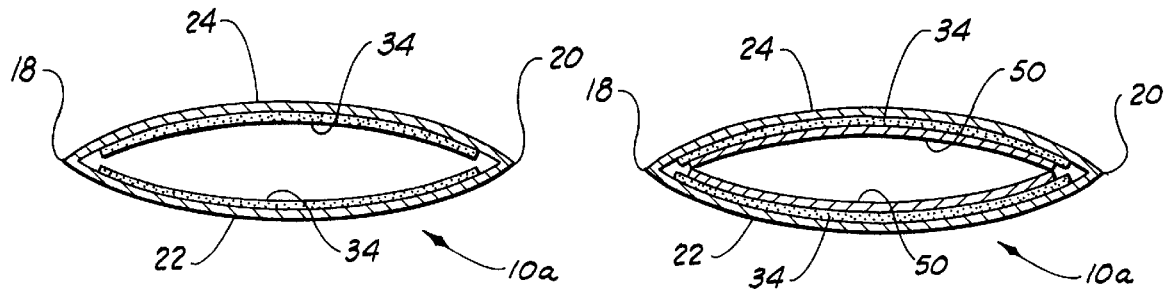
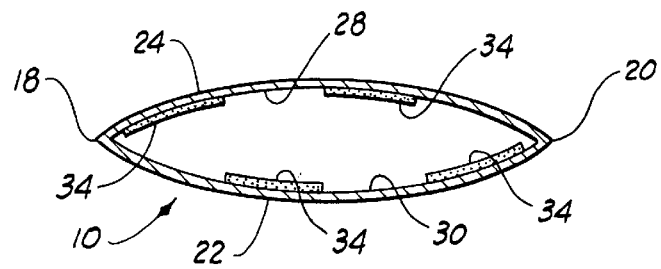
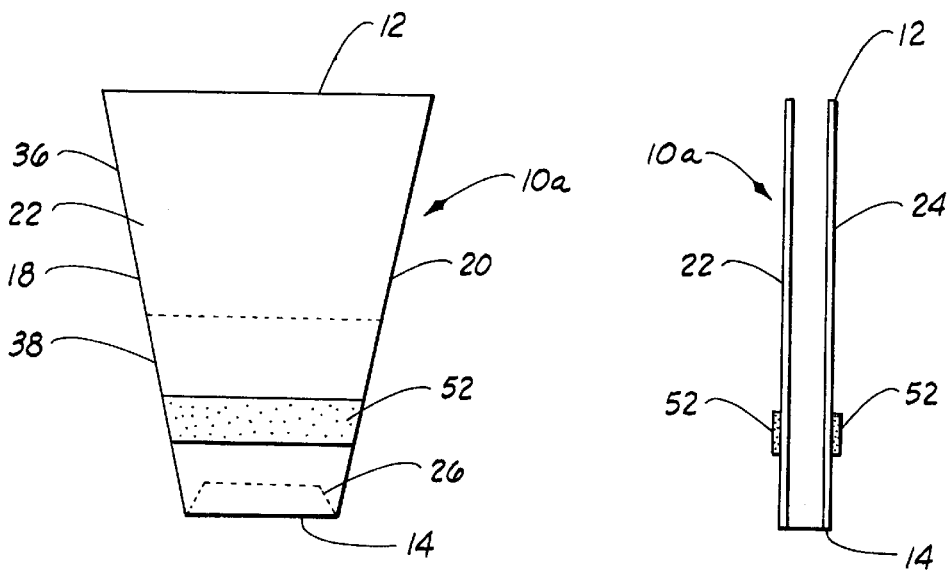

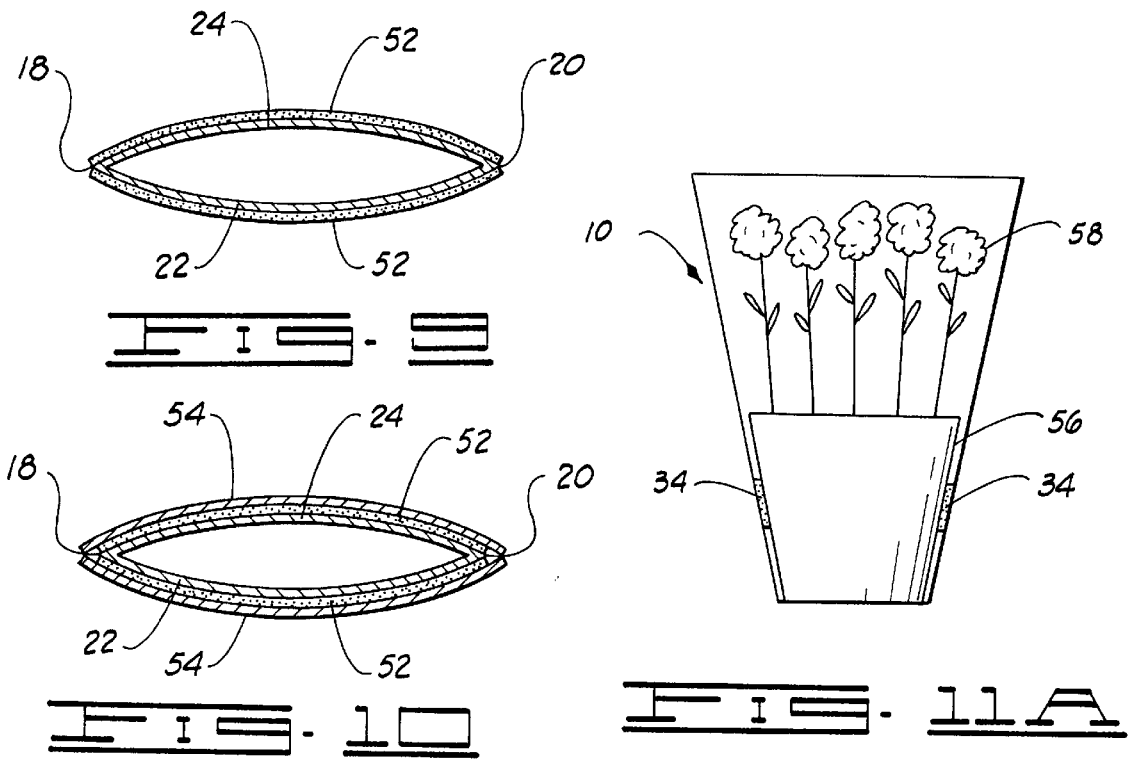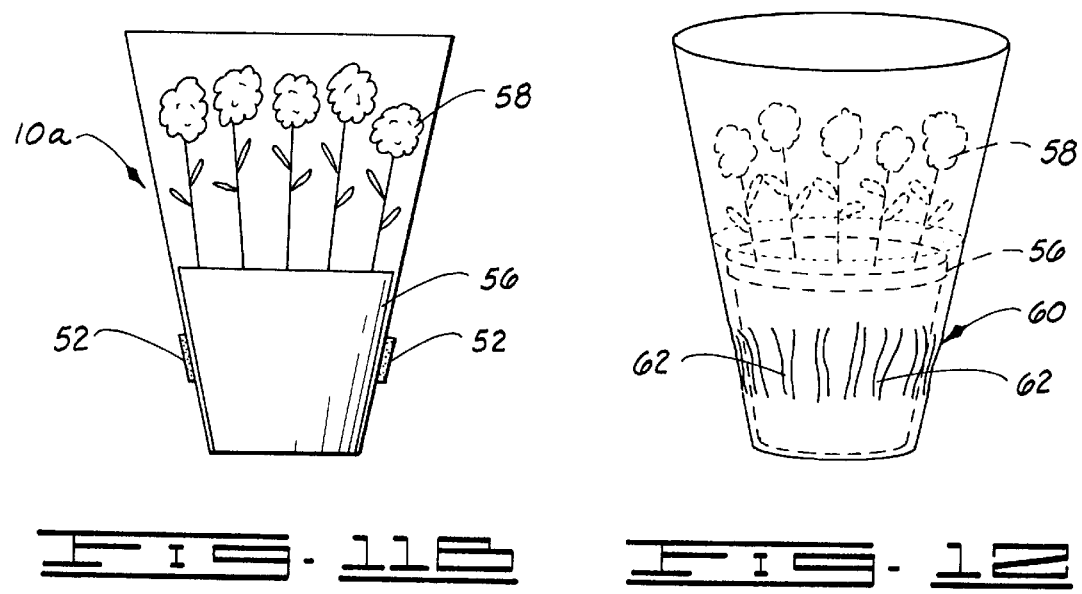

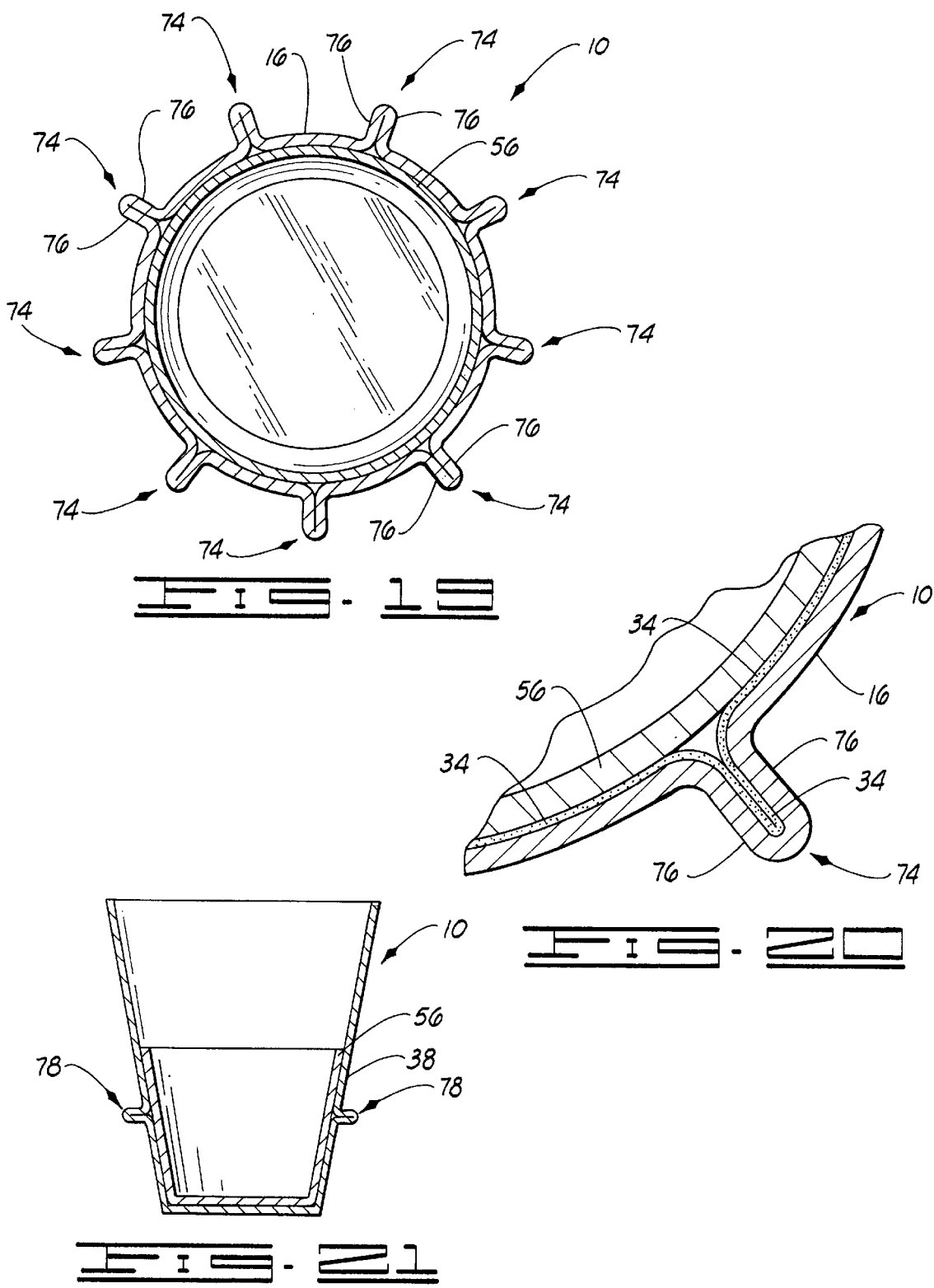

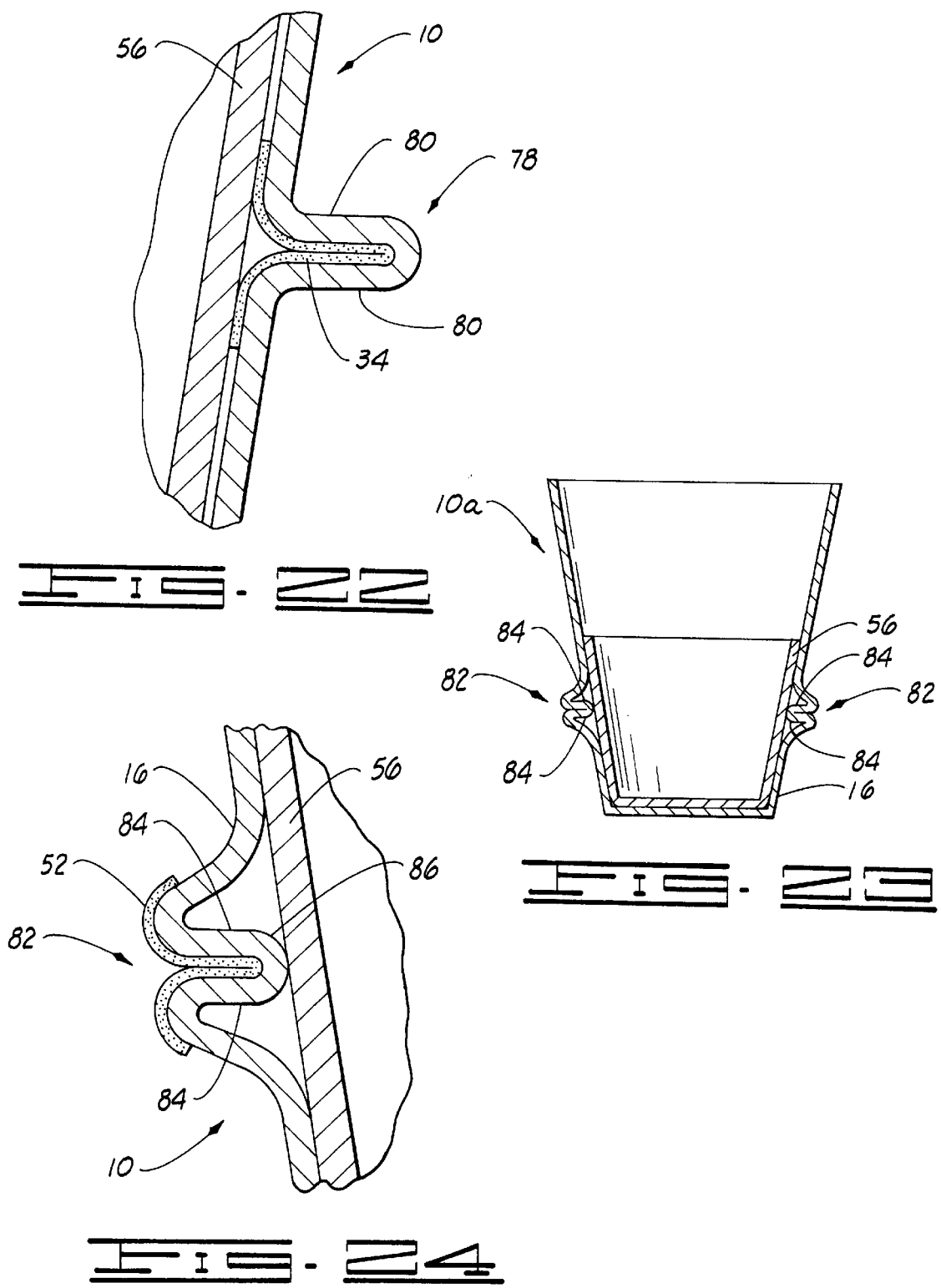

5,829,225

METHOD OF COVERING A FLOWER POT WITH A SLEEVE

CROSS REFERENCE TO RELATED APPLICATIONS

The present application is a continuation-in-part of U.S. Ser. No. 08/608,390, filed Feb. 28, 1996, now U.S. Pat. No. 5,628,146, which is a continuation of U.S. Ser. No. 08/457,186, filed Jun. 1, 1995, entitled "SLEEVE HAVING A DETACHABLE PORTION FOR FORMING A POT COVER", now U.S. Pat. No. 5,572,849, which is a continuation of U.S. Ser. No. 08/386,859, filed Feb. 10, 1995, entitled "SLEEVE HAVING A DETACHABLE PORTION FOR FORMING A POT COVER", now U.S. Pat. No. 5,493,809, issued Feb. 27, 1996, which is a continuation-in-part of U.S. Ser. No. 08/237,078, filed May 3, 1994, entitled "SLEEVE HAVING A DETACHABLE PORTION FOR FORMING A SKIRT AND METHODS", now. U.S. Pat. No. 5,625,979, which is a continuation in part of U.S. Ser. No. 07/940,930, filed Sep. 4, 1992, entitled "Method of Forming a Flower Pot Cover with Crimped Portion", now U.S. Pat. No. 5,361,482.

Each of these patent applications and patents is hereby incorporated herein by reference in their entirety.

BACKGROUND OF INVENTION

This invention generally relates to sleeves, and more particularly, sleeves used to wrap flower pots containing floral groupings and/or mediums containing floral groupings, and methods of using same.

BRIEF DESCRIPTION OF THE DRAWINGS

FIG. 1 is a side view of a sleeve having a detaching element and bonding material and constructed in accordance with the present invention.

FIG. 2A is a side view of a version of a sleeve wherein the perforations have a scalloped pattern.

FIG. 2B is a side view of a version of a sleeve wherein the perforations have an inverted scalloped pattern.

FIG. 2C is a side view of a version of a sleeve wherein the perforations have a wave pattern.

FIG. 2D is a side view of a version of a sleeve wherein the perforations have a zig-zag pattern.

FIG. 2E is a side view of a version of a sleeve wherein the perforations have a rectangular pattern.

FIG. 2F is a side view of a version of a sleeve wherein the perforations are diagonally slanted.

FIG. 3 is a side to side sectional view of a sleeve constructed in accordance with the present invention.

FIG. 4 is a sectional view of the version of the sleeve of FIG. 3.

FIG. 5 is a sectional view of the sleeve of FIG. 3 with a release material disposed on the bonding material.

FIG. 6 is a sectional view of a version of the sleeve having staggered areas of bonding material on the inner surfaces.

FIG. 7 is a side view of an alternate version of the sleeve of the present invention wherein areas of bonding material are disposed upon portions of the outer surface of the sleeve.

FIG. 8 is a sectional view of the sleeve of FIG. 7 having a bonding material disposed on both sides of the sleeve.

FIG. 9 is a top sectional view of the sleeve of FIG. 8 taken through the bonding material.

FIG. 10 is a top sectional view of an alternate version of the sleeve of FIG. 8 wherein release material is disposed upon the areas of bonding material.

FIG. 11A is a side sectional view of a potted plant disposed within a sleeve such as the sleeve shown in FIG. 3.

FIG. 11B is a side sectional view of a potted plant disposed within a sleeve such as the sleeve shown in FIG. 8.

FIG. 12 is a perspective view of a potted plant having a sleeve crimped thereabout.

FIG. 19 is a top sectional view of a sleeve crimped about a pot in yet another style.

FIG. 20 is an enlargement of one of the crimped folds shown in FIG. 19 where the bonding material is disposed on the inner surface of the sleeve.

FIG. 21 is a side sectional view of a sleeve crimped about a pot in yet another style in accordance with the present invention.

FIG. 22 is a side sectional view of an enlargement of one of the crimped folds shown in FIG. 21 where the bonding material is disposed on the inner surface of the sleeve.

FIG. 23 is a side sectional view of a sleeve crimped about a pot in still another style in accordance with the present invention.

FIG. 24 is a side sectional view of an enlargement of one of the crimped folds shown in FIG. 23 where the bonding material is disposed on the outer surface of the sleeve.

DESCRIPTION OF THE PREFERRED EMBODIMENTS

Figure 13:
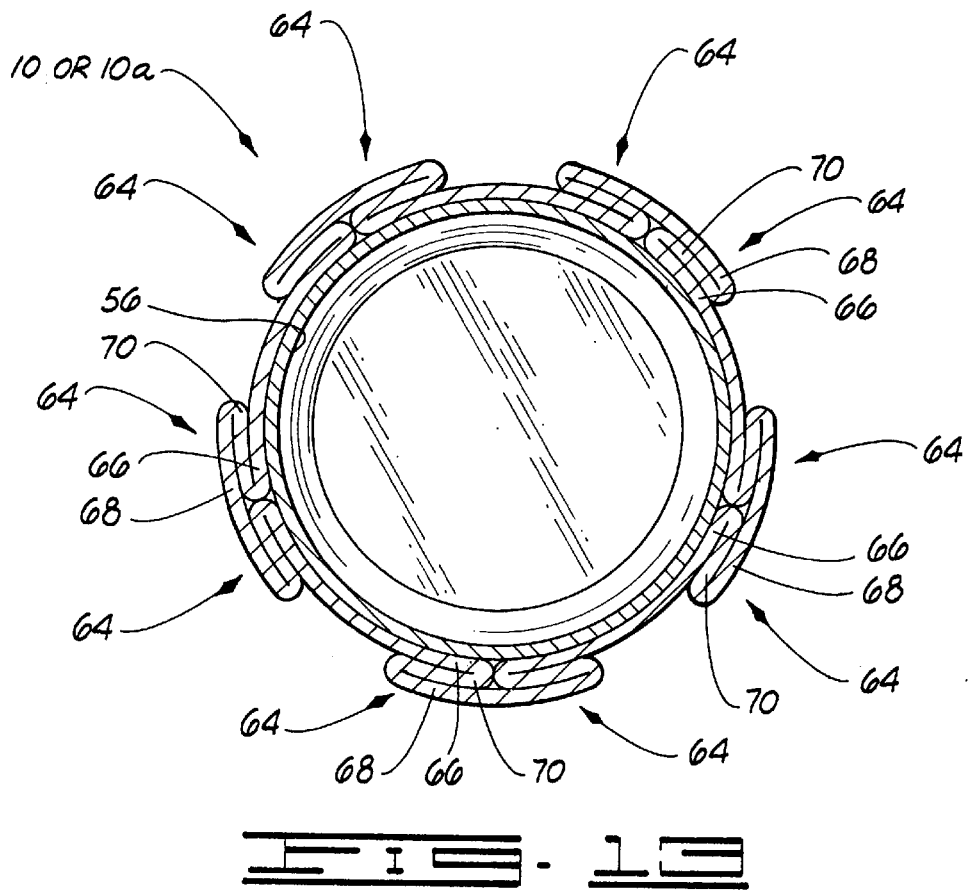
FIG. 13 is a top sectional view of a sleeve crimped about a pot.

The present invention contemplates a plant packaging system comprising a sleeve having a combination of an protective upper portion and a decorative lower portion having a base and optionally a skirt for packaging a potted plant. The upper portion can be detached from the decorative portion of the package system once the function of the upper sleeve has been completed, thereby exposing the decorative cover and allowing the skirt portion, if present, to extend outwardly from the base. The upper sleeve and decorative cover components may comprise a unitary construction or may comprise separate components which are attached together by various bonding materials. The sleeve also has a bonding material thereon for forming a crimped portion which holds the sleeve about a pot without bonding the sleeve to the pot.

The upper sleeve portion may be detachable via a detaching means such as perforations, tear strips and zippers. The plant cover may have an extended portion extending from the upper portion for serving as a handle or support device.

A preferred version of the invention is a flexible sleeve which comprises a flattened body having a closed or open lower end, an open upper end, an outer peripheral surface, and an inner peripheral surface surrounding an inner retaining space. The sleeve further comprises a lower portion having an inner retaining space for enclosing the pot, an upper portion connected to the lower portion and sized to substantially surround and encompass the floral grouping when the pot and floral grouping are disposed within the sleeve, the upper portion detachable from the lower portion via detaching means such as perforations positioned in a predetermined pattern, and a bonding material disposed upon a portion of the inner peripheral surface, the outer peripheral surface or both surfaces, the bonding material for bondingly connecting folded portions of the sleeve when the sleeve is opened and the pot is disposed within the inner retaining space thereby holding the lower portion of the sleeve in a position about the pot and the upper portion of the sleeve in a position about the floral grouping.

The sleeve may further comprise a release material for preventing the bonding material from bondingly connecting to an opposing portion of the sleeve or to a surface thereof. A closure bonding material may be disposed upon the upper portion near the upper end for sealing the upper end of the sleeve for enclosing the floral grouping within the upper portion. The upper portion may further comprise apertures for enabling ventilation of the enclosed floral grouping.

The flattened body may be further defined as having a first side which has a first edge, a second edge, an upper edge, a lower edge, an outer surface and an inner surface, a second side which has a first edge, a second edge, an upper edge, a lower edge, an outer surface and an inner surface, and wherein in a flattened condition of the sleeve, the inner surface of the first side rests flatwise upon the inner surface of the second side and the first edge of the first side is sealed to the first edge of the second side and the second edge of the first side is sealed to the second edge of the second side.

Further detail and explanation of the articles and methods of the present invention are forthcoming in the description provided below.

Embodiments of FIGS. 1–12

Shown in FIGS. 1 through 3 and designated therein by the general reference numeral 10 is a flexible bag or sleeve of unitary construction. The sleeve 10 initially comprises a flexible flattened piece of material which is openable into the form of a tube or sleeve. The sleeve 10 is preferably tapered outwardly from the lower end toward a larger diameter at its upper end as shown in FIG. 1, or may be cylindrical. In its flattened state the sleeve 10 may have an overall trapezoidal, modified trapezoidal or contoured (non-linear) shape, and when opened is generally substantially frusto-conical to coniform. It will be appreciated, however, that the sleeve 10 may comprise variations on the aforementioned shapes or may comprise significantly altered shapes such as square or rectangular, wherein the sleeve 10 when opened has a cylindrical form, as long as the sleeve 10 functions in accordance with the present invention in the manner described herein.

The sleeve 10 has an upper end 12, a lower end 14, an outer peripheral surface 16 and in its flattened state has a sealed first edge 18 and a sealed second edge 20 and a first side 22 and a second side 24. The sleeve 10 has an opening 25 at the upper end 12 and in one version of the invention has a closed bottom at the lower end 14. Preferably the lower end 14 when closed has a gusset 26 but it may simply be sealed along an edge. The first side 22 has a first inner peripheral surface 28 and the second side 24 has a second inner peripheral surface 30 which together, when the sleeve 10 is opened, define and encompass an inner retaining space 32 as shown in FIG. 3. When the lower end 14 of the sleeve 10 has a closed bottom, a portion of the lower end 14 may be inwardly folded to form one or more gussets, as noted above for permitting a circular bottom of an object such as a potted plant to be disposed into the inner retaining space 32 of the lower end 14 of the sleeve 10. When present, the gusset may be a standard straight gusset forming a straight bottom edge on the sleeve or the gusset may have a rounded portion such as is shown and described in U.S. Ser. No. 08/606,957, the specification and drawings of which are hereby incorporated herein in their entirety.

The sleeve 10 is generally frusto-conically shaped, but the sleeve 10 may be, by way of example but not by way of limitation, cylindrical, frusto-conical, a combination of both frusto-conical and cylindrical, or any other shape, as long as the sleeve 10 functions as described herein as noted above. Further, the sleeve 10 may comprise any shape, whether geometric, non-geometric, asymmetrical and/or fanciful as long as it functions in accordance with the present invention. In a preferred embodiment the sleeve is oversized. Where used herein the term "oversized" means that the portion of the sleeve adjacent the pot comprises an excess amount of material sufficient for forming the crimped portion. The sleeve 10 may also be equipped with drains or ventilation holes (not shown), or can be made from permeable or impermeable materials.

The material from which the sleeve 10 is constructed preferably has a thickness in a range from about 0.1 mils to about 30 mils, although in some cases the sleeve may be much thicker, especially when the sleeve is constructed from multiple layers. Often, the thickness of the sleeve 10 is in a range from about 0.5 mils to about 10 mils. Preferably, the sleeve 10 has a thickness in a range from about 1.0 mil to about 5 mils. More preferably, the sleeve 10 is constructed from material which is flexible, semi-rigid, rigid, or any combination thereof. The sleeve 10 may be constructed of a single layer of material or a plurality of layers of the same or different types of materials. Any thickness of the material may be utilized as long as the material functions in accordance with the present invention as described herein. The layers of material comprising the sleeve 10 may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the sleeve 10 may be formed as described herein, and as long as the formed sleeve 10 may contain at least a portion of a pot or potted plant or a floral grouping, as described herein. Additionally, an insulating material such as bubble film, preferable as one of two or more layers, can be utilized in order to provide additional protection for the item, such as the floral grouping, contained therein.

In one embodiment, the sleeve 10 may be constructed from two polypropylene films. The material comprising the sleeve 10 may be connected together or laminated or may be separate layers. In an alternative embodiment, the sleeve 10 may be constructed from only one of the polypropylene films.

The sleeve 10 may also be constructed, in whole or in part, from a cling material, "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a pot. This connecting engagement is preferably temporary in that the material may be easily removed, i.e., the cling material "clings" to the pot.

The cling material is constructed and treated if necessary, from polyethylene such as Cling Wrap made by Glad®, First Brands Corporation, Danbury, Conn. The thickness of the cling material will, in part, depend upon the size of sleeve 10 and the size of the pot in the sleeve 10, i.e., generally, a larger pot may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The sleeve 10 is constructed from any suitable material that is capable of being formed into a sleeve and wrapped about a pot and a floral grouping disposed therein. Preferably, the material comprises paper (untreated or treated in any manner), cellophane, metal foil, polymer film, non-polymer film, fabric (woven or nonwoven or synthetic or natural), cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material comprising the sleeve 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various coloring, coatings, flocking and/or metallic finishes, or other decorative surface ornamentation applied separately or simultaneously or may be characterized totally or partially by pearlescent, translucent, transparent, iridescent, neon, or the like, qualities. Each of the above-named characteristics may occur alone or in combination and may be applied to the upper and/or lower surface of the material comprising the sleeve 10. Moreover, portions of the material used in constructing the sleeve 10 may vary in the combination of such characteristics. The material utilized for the sleeve 10 itself may be opaque, translucent, transparent, or partially clear or tinted transparent.

It will generally be desired to use the sleeve 10 as a covering for a potted plant such as is well known in the art. The term "pot" as used herein refers to any type of container used for holding a floral grouping or plant. Examples of pots, used in accordance with the present invention include, but not by way of limitation, clay pots, wooden pots, plastic pots, pots made from natural mud/or synthetic fibers, or any combination thereof. The pot is adapted to receive a floral grouping in the retaining space. The floral grouping may be disposed within the pot along with a suitable growing medium described in further detail below, or other retaining medium, such as a floral foam. It will also be understood that the floral grouping, and any appropriate growing medium or other retaining medium, may be disposed in the sleeve 10 without a pot.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). the term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material is disposed on a portion of the sleeve 10 to assist in holding the sleeve 10 about the pot having the floral grouping therein when such a pot is disposed within the sleeve 10. An additional bonding material may be disposed upon a portion of the sleeve 10 to assist in closing the upper end of the sleeve 10 after the pot has been disposed therein, as will be discussed in further detail below.

It will be understood that the bonding material may be disposed as a strip or block on a surface of the sleeve 10 as is described in more detail herein. The bonding material may also be disposed upon either the first side 22, the second side 24, the first inner peripheral surface 28, or the second inner peripheral surface 30, of the sleeve 10. Further, the bonding material may be disposed as spots of bonding material, or in any other geometric, non-geometric, asymmetric, or fanciful form and in any pattern including covering either the entire inner peripheral surface and/or outer peripheral surface of the sleeve 10 and/or the pot or pot cover.

The bonding material may be covered by a cover material or release strip which can be removed prior to the use of the sleeve, pot or pot cover. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material or bonding means" when used herein means an adhesive, frequently a pressure sensitive adhesive, or a cohesive which bonds only to a surface having another such cohesive thereon. The term "bonding material or bonding means" also includes materials which are heat sealable and, in this instance, the adjacent portions of the material must be brought into contact and then heat must be applied to effect the seal. The term "bonding material or bonding means" also includes materials which are sonic sealable and vibratory sealable. The term "bonding material or bonding means" when used herein also means a heat sealing lacquer or hot melt material which may be applied to the material and, in this instance, heat, sound waves, or vibrations, also must be applied to effect the sealing.

Alternatively, a cold seal adhesive may be utilized as the bonding material or means. The cold seal adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the desired shape is reduced. A cold seal adhesive binds quickly and easily with minimal pressure, and such a seal is not readily releasable. This characteristic is different from, for example, a pressure sensitive adhesive.

Certain versions of the sleeve 10 described herein may be used in conjunction with a preformed plant cover as explained in greater detail below.

As shown in FIG. 1, in a preferred version of the invention, the sleeve 10 is demarcated into an upper portion 36 and a lower portion 38. As noted above, the lower portion 38 of the sleeve 10 is oversized, that is it is generally sized to be at least slightly larger than the size of the pot to be placed within the lower portion to enable the lower portion 38 to be crimped about the outer surface of the pot. The lower portion 38 may have a height equal to or greater than the height of the pot disposed within the sleeve. The upper portion 36 may optionally have apertures 39 near the upper end thereof for allowing the sleeve 10 to be supported by a support mechanism such as a pair of wickets (not shown) such as is known in the art. The upper portion 36 of the sleeve 10 is generally sized to substantially surround and encompass the floral grouping of the potted plant disposed within the lower portion 38 of the sleeve 10. The sleeve 10 is demarcated into the upper portion 36 and the lower portion 38 by a detaching element 40 for enabling the detachment of the upper portion 36 of the sleeve 10 from the lower portion 38 of the sleeve 10. In another version of the present invention, the sleeve may be comprised only of a "lower portion" which generally encompasses only the pot and may extend about a lower portion of the floral grouping, i.e., there is no upper portion for substantially surrounding and encompassing the floral grouping. In the version shown in FIG. 1, the detaching element 40 is a plurality of perforations which extend across the outer peripheral surface 16 of the sleeve 10 from the first edge 18 to the second edge 20.

The term "detaching element," or "detaching means" as used generally herein, means any element or means, or combination of elements, or features, such as, but not limited to, perforations, tear strips, tear starts, zippers, and any other devices or elements of this nature known in the art, or any combination thereof, which enable or facilitate the tearing away or detachment of one object from another. Therefore, while perforations are shown and described in detail herein, it will be understood that tear strips, zippers, or any other "detaching elements" known in the art, or any combinations thereof, could be substituted therefor and/or used therewith. The sleeve 10 may comprise drainage or ventilation holes in the upper or lower portions for allowing movement of gases or moisture to and away from the inner space of the sleeve (not shown).

In a preferred embodiment, as shown in FIG. 1, the detaching element 40 leaves a straight edge when detached. In any event, once the upper portion 36 is detached, the lower portion 38 comprises a base portion 42 and may leave a skirt portion if the detaching element is not straight. Shown in FIGS. 2A–2F are sleeves which are exactly like sleeve 10 except each has an alternative arrangement of perforations for enabling separation of the upper portion of a sleeve from the lower portion wherein a skirt portion is left extending above the pot. FIG. 2A shows a sleeve having a detaching element 40a comprising perforations having a scalloped pattern. FIG. 2B shows a sleeve which has a detaching element 40b comprising perforations having an upside-down, or inverted, scalloped pattern. FIG. 2C shows a sleeve which has a detaching element 40c comprising perforations having a wavy or sine-wave type pattern. FIG. 2D shows a sleeve which as a detaching element 40d having a toothed or zig-zag perforation pattern.

FIG. 2E shows a sleeve which has a detaching element 40e comprising perforations having a rectangular pattern. Shown in FIG. 2F is a sleeve having a detaching element 40f which comprises perforations having a diagonally-oriented pattern. Each of these sleeves, as for the other sleeves described herein, may have a vertically-oriented line of perforations or other detaching element extending from the upper end of the sleeve to the other line of perforations for facilitating removal of the upper portion.

The base portion comprises that part of the lower portion 38 which, when the pot is placed into the lower portion 38, has an inner peripheral surface which is substantially adjacent to and surrounds the outer peripheral surface of the pot. The skirt portion comprises that part of the lower portion 38 which extends beyond the upper rim of the pot and adjacent at least a portion of the floral grouping contained within the pot, generally the lower portion of the floral grouping, and which is left to freely extend straight from or at angle, inwardly or outwardly, from the base portion when the upper portion of 36 of the sleeve 10 is detached from the lower portion 38 of the sleeve 10 by actuation of the detaching element 40. In the intact sleeve 10, the skirt portion, designated by the reference numeral 44 in FIG. 2A comprises an upper peripheral edge 46 generally congruent with the detaching element 40 which is connected to a lower peripheral edge 48 of the upper portion 36 of the sleeve 10 also congruent with the detaching element 40. In FIGS. 2A–2F, the upper peripheral edge 46 of the skirt portion 44 is congruent with a series of perforations which together comprise the detaching element 40a–40f.

The upper portion 36 of the sleeve 10 may also have an additional detaching element (not shown) such as a plurality of vertical perforations for facilitating removal of the upper portion 36 and which are disposed more or less vertically therein extending from the detaching element 40 to the upper end 12 of the sleeve 10. When the vertical detaching element is present the upper portion 36 of the sleeve 10 is separable from the lower portion 38 of the sleeve 10 by tearing the upper portion 36 along both the vertical perforations and along the detaching element 40, thereby separating the upper portion 36 from the lower portion 38 of the sleeve 10. The lower portion 38 of the sleeve 10 remains disposed as the base portion 42 about the pot and as the skirt portion 44 about the floral grouping which extends from the pot forming a decorative cover which substantially surrounds and encompasses the pot and at least a portion of the floral grouping.

It will be understood that equipment and devices for forming standard floral sleeves are commercially available, and are well known to a person of ordinary skill in the art. A preferred method is discussed below.

As noted above, the sleeve 10 preferably has a closed lower end 14. When the lower end 14 is closed the lower end 14 may have one or more gussets 26 formed therein for allowing expansion of the lower end 14 when an object with a broad lower end such as a pot is disposed therein. In another version of the present invention the lower end 14 may be completely or partially open (as shown in FIG. 8). Where used herein the term "partially open" means that the bottom end of the sleeve is partially covered with the sleeve material but has at least one opening therein, for example for allowing drainage.

As noted above, in the preferred version of the present invention, the sleeve 10 comprises an area of bonding material 34 disposed upon a portion of the inner peripheral surface 28 and or 30 of the base portion 42 of the sleeve 10. The area of bonding material 34, when present, functions to enable portions of the inner peripheral surface 28, to be bondingly connected to other portions of the inner peripheral surface of the sleeve 10 by crimping therein forming a crimped portion and causing the sleeve 10 to be secured about the pot.

The sleeve 10 is generally provided to the operator in a substantially flattened condition and usually as one of a stack of a plurality of sleeves. During the process of covering the pot, the sleeve 10 is opened, manually or automatically. In the flattened condition of the sleeve 10, the bonding material 34 may partially adhere or cohere to the opposite inner peripheral surface of the sleeve 10. Obviously, it is desirable to avoid a situation in which the bonding material 34 is permanently or strongly bonded to the opposing inner peripheral surface of the sleeve 10 because this would make it difficult for the sleeve 10 to be manually or automatically opened for insertion of the pot. As a result, the bonding material 34 may be made of an adhesive composition which has a low degree of tackiness such that if the bonding material 34 does adhere to the opposing inner peripheral surface it can be easily separated from the surface when the sleeve is opened up. Such adhesives with low tackiness are well known to those of ordinary skill in the art and are commercially available. Further, a release material may be disposed on the bonding material 34 to prevent its adhesion prior to its use.

Alternatively, the pot bonding material 34 can be composed of a cohesive material. In the version of the invention shown in FIG. 1 the cohesive is applied to only one of the inner peripheral surfaces, the cohesive will not bond to the opposite inner surface as long as there is no cohesive material to which it can bond on the opposing inner surface. In another version of the sleeve 10, shown in FIG. 3, the sleeve has a bonding material 34 disposed on both inner surfaces 28 and 30. The bonding material 34 may be any bonding material as defined herein and the sleeve 10 may have a release covering or liner disposed on or between the layers of bonding material 34 for inhibiting adhesion or cohesion of the bonding material 34 before usage of the sleeve 10 for covering a pot.

Shown in FIG. 4 is a sectional plan view of sleeve 10 taken through the bonding material 34 wherein the bonding material 34 is disposed in strips on opposing inner surfaces 28 and 30 of the sleeve. The strips of bonding material 34 may extend completely from one side of the sleeve 10 to the other, generally as indicated in FIG. 4 or they may extend only part of the distance from one side to the other. As indicated above, the bonding materials 34 may have release liners thereover for preventing premature adhesion or cohesion thereof, the release liners indicated in FIG. 5 by reference numeral 50. FIG. 6 shows an embodiment wherein the areas of bonding material 34 are staggered across the inner surfaces 28 and 30 of the sleeve 10 to minimize cohesion or adhesion of the areas of bonding material 34 to opposing surfaces.

In yet another version of the present invention, shown in FIGS. 7–10, a bonding material 52 disposed on at least one of the outer peripheral surfaces 22 or 24 of the lower portion 38 of the sleeve 10. Similarly to the use of sleeve 10, after the pot is disposed in the retaining space of the lower portion 38, the sleeve 10a is manually or automatically crimped about the outer peripheral surface of the pot in the vicinity of the bonding material 52 thereby forming folds in the lower portion 38 which are bondingly connected together by the bonding material 52 to secure the sleeve 10a about the pot. The bonding material 52 is preferably disposed on the sleeve 10a so as to be at a position below the upper rim of the pot when the pot is disposed in the lower portion 38 of the sleeve 10a.

The bonding material 52 may be disposed on only one outer side 22 or 24 of the sleeve 10a as shown in FIG. 7 or may be disposed on both sides 22 and 24 of the sleeve 10a as shown in FIG. 8. FIG. 9 is a sectional plan view taken through the sleeve 10a of FIG. 8 showing the bonding material 52 on both outer sides 22 and 24 and extending substantially from edge 18 to edge 20, although it will be appreciated that the bonding material 52 may extend only part of the distance from side 18 to side 20.

As noted above for sleeve 10, the bonding material 52 on sleeve 10a may have a release material 54 disposed thereon such as is shown for example in FIG. 10.

In an alternate version of the sleeve 10 or 10a, disposed upon the upper end of the inner peripheral surface 30 of side 24 is a closure bonding material (not shown). After a pot is disposed within the sleeve, the upper end portion of side 24 with the closure bonding material disposed thereon can be folded onto an upper end portion of side 22 thereby sealing the upper portion of the sleeve.

In another version of the invention there is a second closure bonding material which is disposed upon an upper end portion of side 22. When the upper end portion of side 24 having the closure bonding material is folded over onto side 22, the closure bonding material 68 bondingly engages the second closure bonding material thereby effecting a seal in the upper end 12 of the sleeve. Preferably, in this version, the first and second closure bonding materials are both cohesive materials so that when another sleeve is pressed against the sleeve, neither bonding material will cause the adjacent sleeves to be connected to each other thereby facilitating the separation of sleeves 10n from the stack.

It will be readily appreciated by those of ordinary skill in the art that processes for making standard floral sleeves which have open upper and lower ends are well known. In the preferred embodiments of the present invention, the sleeve is constructed with a closed bottom which may simply comprise a seal along the lower end of the sleeve or more preferably the closed bottom comprises an infolded portion such as a gusset which when opened enables expansion of the bottom of the sleeve for allowing insertion of a pot therein.

One version of the apparatus and process used to construct a sleeve as described herein is shown in FIGS. 39–44 and accompanying descriptions in U.S. Pat. No. 5,493,809, the specification of which is hereby incorporated herein by reference in its entirety.

During operation, when the sleeve 10 or 10a is opened in anticipation of disposing a pot within the interior space 32 thereof, after opening, the release material 50 or 54, respectively, if present, can be removed from the space corresponding bonding material of the sleeve prior to insertion of the pot therein.

Shown in FIGS. 11A and 11B are sleeves 10 and 10a after a pot 56 having a floral grouping 58 is disposed therein. FIG. 11A shows the pot 56 disposed adjacent and facing the bonding material 34 of the sleeve 10 and FIG. 11B shows the pot 56 disposed within the sleeve 10a with the bonding material 52 adjacent, yet opposite the surface of the pot 56. In the preferred embodiment of the present invention, the bonding material 34 is a bonding material such as a cohesive which bonds only to surfaces also having said cohesive. Therefore, the bonding material 34 is not intended to bondingly connect to the outer surface of the pot 56. Rather, it is intended that the sleeve 10 be secured about the pot 56 without bondingly connecting to the pot 56 itself. For example, the sleeve 10 or 10a may be secured to the pot by the forming of a crimped area 60 in the lower portion 38 of the sleeve 10 or 10a as shown in FIG. 12. The crimped area 60 is formed by forming folds 62 in that portion of the sleeve 10 or 10a having the bonding material 34 or 52. Preferably the lower portion 38 of the sleeve 10 or 10a is at least slightly larger than the pot 56 so that the folds 62 can be formed in the sleeve 10 or 10a to secure the sleeve about the pot 56. At least some of the folds 62 have overlapping portions which are connected by the bonding material 34 or 52 as explained in more detail below.

Embodiments of FIGS. 13–24

Shown in FIGS. 13–24 are several examples of how folds can be formed in the lower portion 38 of the sleeve 10 or 10a for securing the sleeve 10 or 10a about the pot 56 without bondingly connecting the sleeve to the pot itself.

FIG. 13 shows a sleeve 10 or 10a having a plurality of folds in which some portions of the folds are connected by a bonding material 34 on the inner surface of the sleeve (sleeve 10) or by a bonding material 52 on the outer surface of the sleeve (sleeve 10a). FIG. 13 shows a plurality of z-shaped overlapping folds 64 connected by the bonding material (not shown).

Each z-shaped overlapping fold 64 shown in FIG. 13 has an inner portion 66, an outer portion 68 and a middle portion 70 which is sandwiched between the inner and outer portions 66 and 68.

Figure 14:
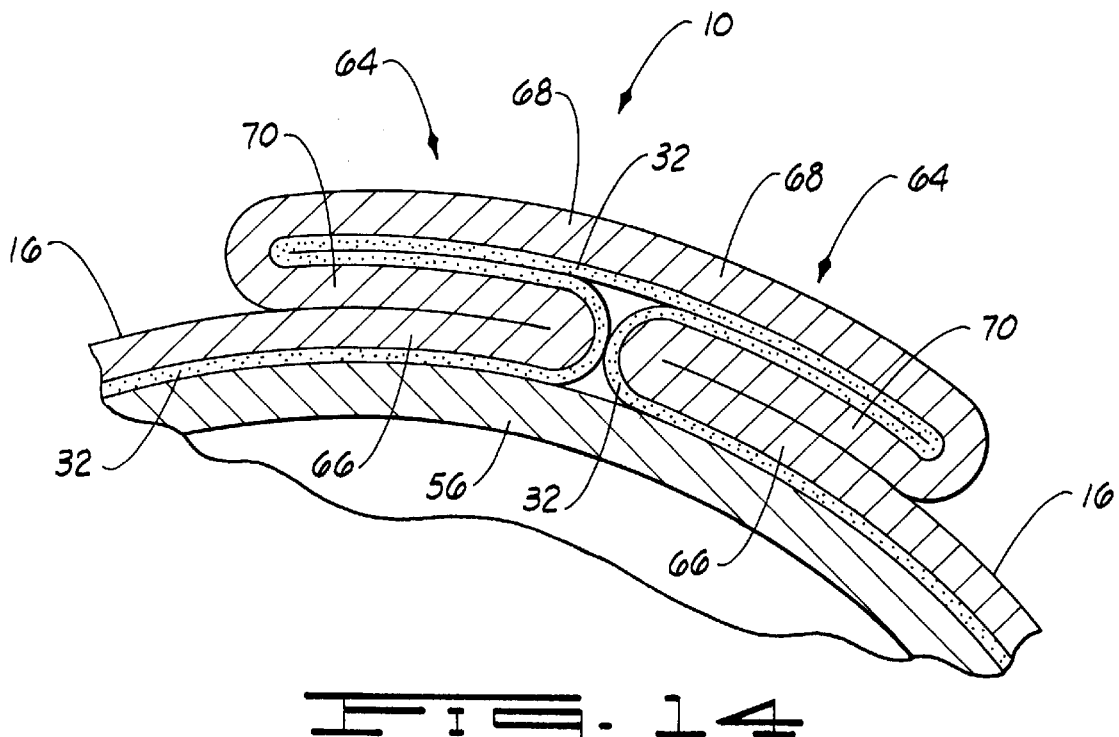
FIG. 14 is an enlargement of one of the crimped folds shown in FIG. 13 where the bonding material is disposed on the inner surface of the sleeve.

FIG. 14 shows an enlargement of a z-shaped overlapping fold 64 which shows the position of the bonding material 32 disposed on the inner surface of the sleeve 10 in relation to the overlapping portions of the sleeve 10. Portion 66 is not bonded to portion 70 since there is no bonding material disposed on outer surface 16 of the sleeve 10 in this embodiment. The inner surface of the portion 70 faces and is bonded to the inner surface of portion 68 of the sleeve 10 via the bonding material 32 which is disposed on the inner surface of sleeve 10. A similar pattern is repeated for each corresponding z-shaped fold 64 and for each other z-shaped fold 64 in the sleeve 10.

Figure 15:
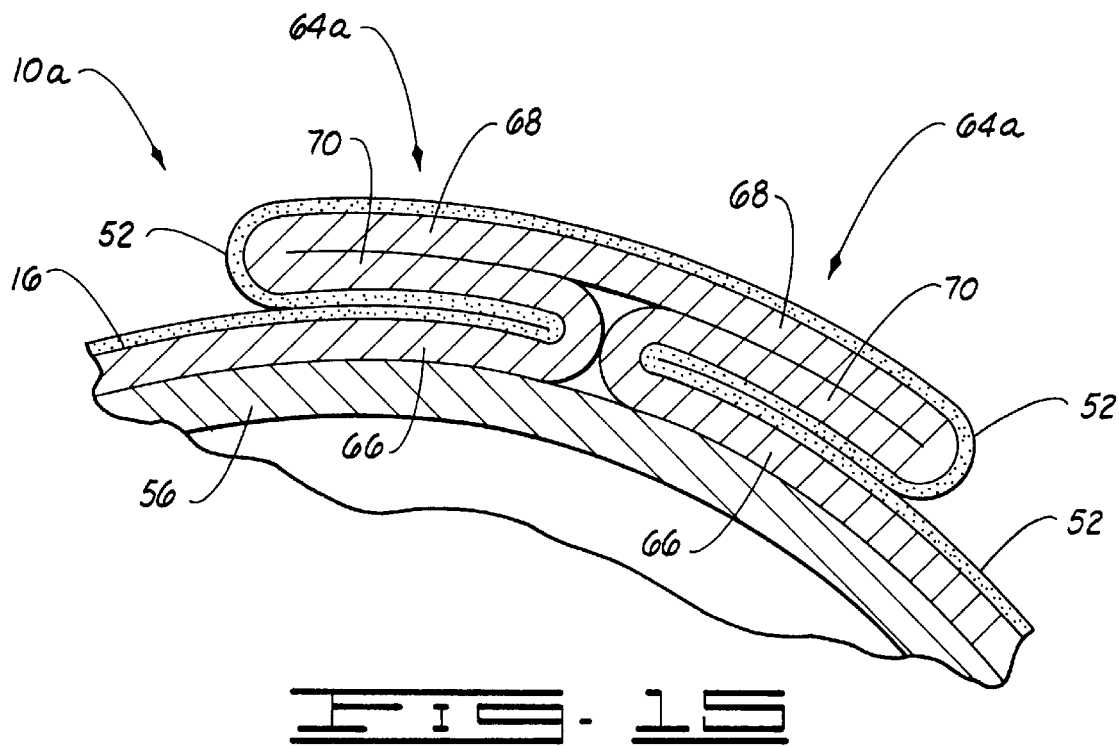
FIG. 15 is an enlargement of one of the crimped folds shown in FIG. 13 where the bonding material is disposed on the outer surface of the sleeve.

FIG. 15 shows an enlargement of a z-shaped overlapping fold 64a similar to that of FIG. 14 except that the FIG. 15 represents a fold 64 formed in sleeve 10a having a bonding material 52 disposed on the outer surface 16 of the sleeve 10a. Fold 64a has an inner portion 66, an outer portion 68 and a middle portion 70 sandwiched between portions 66 and 68. Portion 70 is connected to portion 66 via the bonding material 52. Portion 68 is not connected to portion 70 because there is no bonding material interposed between the two portions.

Figure 16:
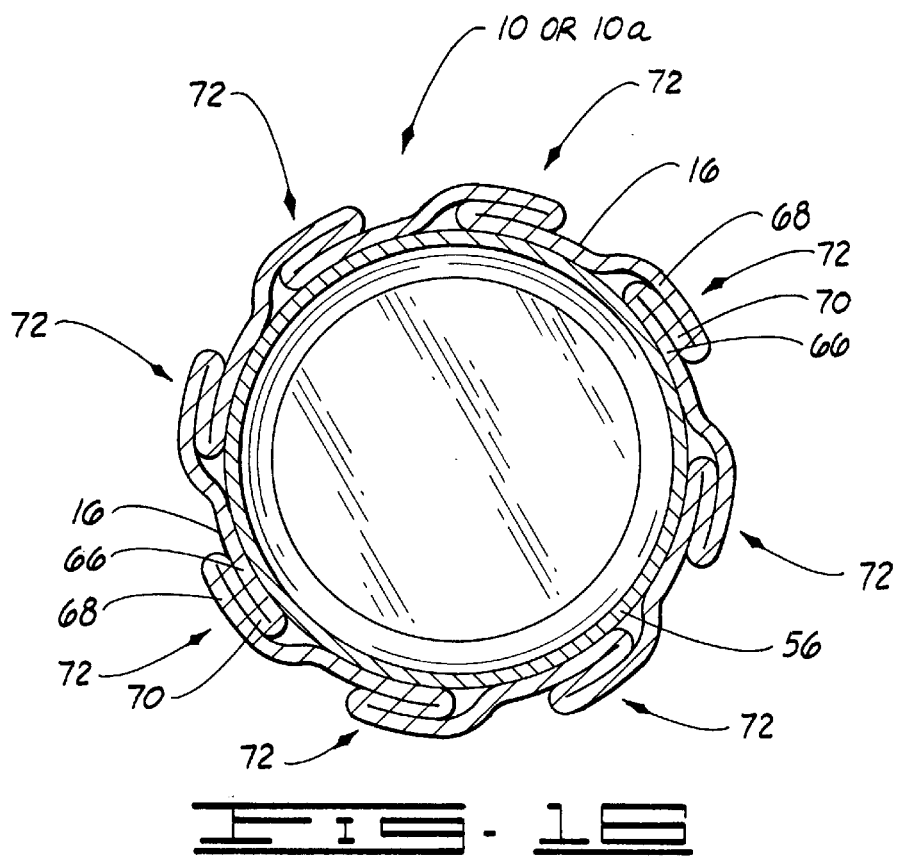
FIG. 16 is a top sectional view of a sleeve crimped about a pot in an alternate style.

FIG. 16 shows yet another manner in which the sleeve 10 or 10a may be secured about the pot 56. In this version there are a plurality of folds 72 which are similar to the z-shaped folds 64 shown in FIGS. 13–15 except that the folds 64 shown in FIGS. 13–15 are positioned as pairs of "mirror image" folds 64 while in FIG. 16 each z-shaped fold 72 occurs, singly and not as one of a distinct pair of adjacent folds 64.

Each fold 72 has an inner portion 66, and outer portion 68 and a middle portion 70 sandwiched between portions 66 and 68. The surface 16 of the portion 66 faces the surface 16 of a portion 70.

Figure 17:
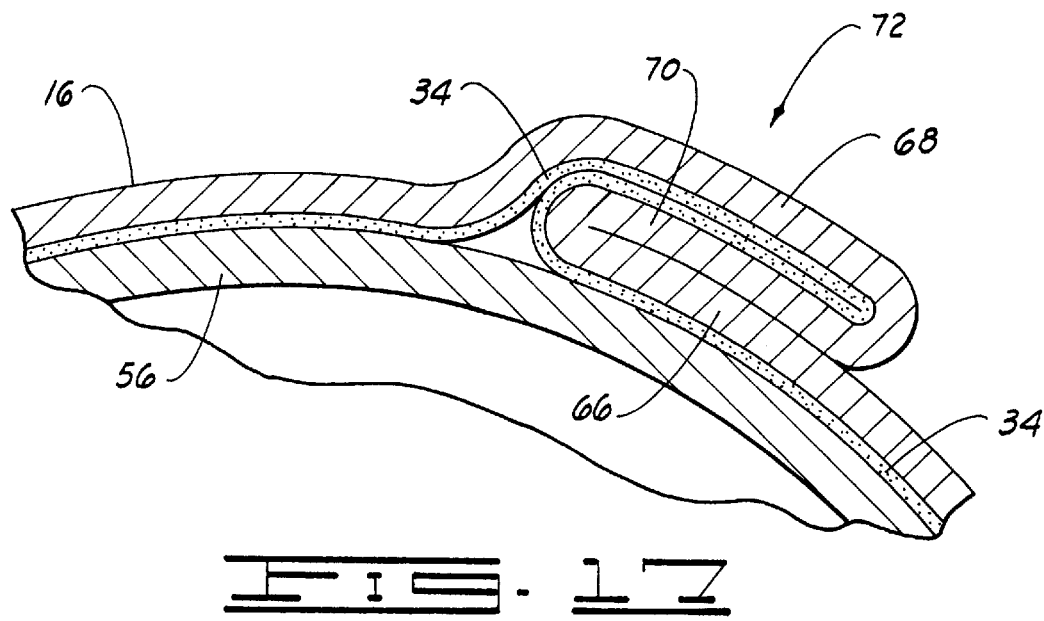
FIG. 17 is an enlargement of one of the crimped folds shown in FIG. 16 where the bonding material is disposed on the inner surface of the sleeve.
Figure 18:
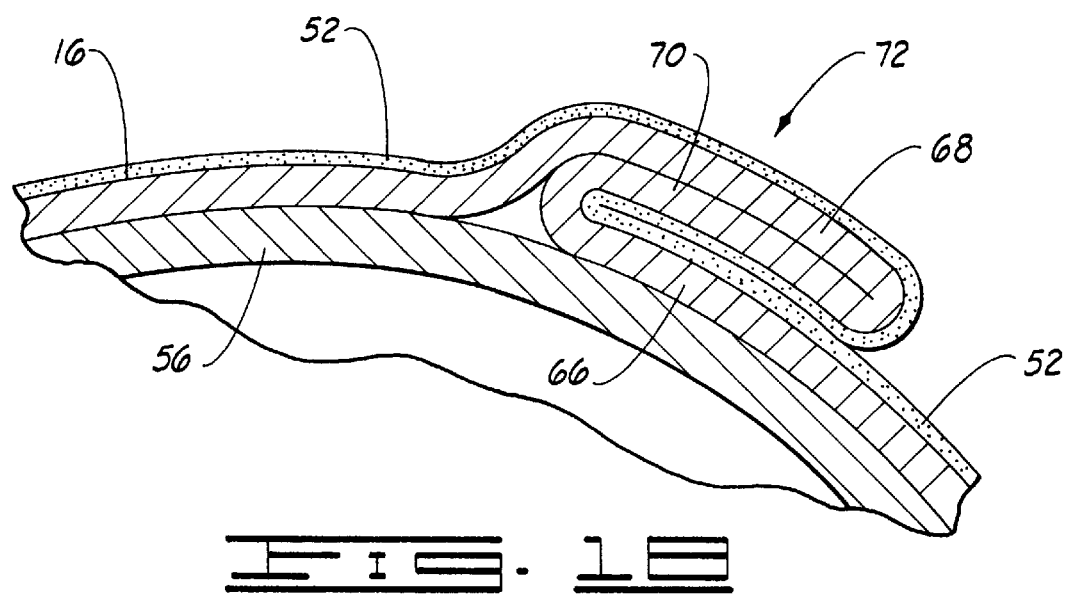
FIG. 18 is an enlargement of one of the crimped folds shown in FIG. 16 where the bonding material is disposed on the outer surface of the sleeve.

FIG. 17 shows such a fold 72 formed in a sleeve such as sleeve 10 wherein the bonding material 34 is disposed on an inner surface of the sleeve 10. Bonding material 34 touches the outer surface of the pot 56 but does not connect to it because the bonding material 34 is preferably a cohesive bonding material rather than an adhesive material. In such an embodiment, the inner surface of portion 68 is bondingly connected via bonding material 34 to the inner surface of portion 70, while portions 66 and 70 are not bondingly connected. FIG. 18 shows a fold 72 formed in sleeve 10a having the bonding material 52. The outer surface 16 of portion 66 is bondingly connected via bonding material 52 to the outer surface of portion 70. Portion 68 is not bondingly connected to portion 70.

FIGS. 19 and 20 show another embodiment of the sleeve 10 crimped about a pot 56 comprising a plurality of vertically-oriented folds 74 in which portions 76 of the sleeve 10 are pinched together forming a U-shaped fold 74, extending outwardly from the pot 56 and wherein the inner surfaces of the portions 76 of the folds 74 in sleeve 10 which face each other are bondingly engaged to each other by the bonding material 34 disposed on the inner surface of the sleeve 10. A similar bonding pattern is repeated for each U-shaped fold 74 in the sleeve 10.

FIGS. 21 and 22 show another embodiment of the sleeve 10 crimped about a pot 56 comprising one or more horizontally-oriented folds 78 in which portions 80 of the sleeve 10 are pinched together forming a U-shaped fold 78 extending outwardly and extending about at least part of the circumference of the pot 56. The inner surfaces of the portions 80 of the fold 78 which face each other are bondingly connected via the bonding material 34 disposed on the inner surface of sleeve 10. The fold 78 in FIG. 22 in an enlargement of the fold 78 in FIG. 21 for explicitly showing the connection mode via the bonding material 34.

FIGS. 23 and 24 shown another embodiment of the sleeve 10a crimped about a pot 56 comprising one or more horizontally-oriented folds 82 in which portions 84 of the sleeve 10a are pinched together forming an inverted U-shaped fold 82 wherein the tip 86 of the U-shaped fold 82 extends inwardly toward the outer surface of the pot 56 thereby forming an inwardly-oriented ridge. The outer surfaces 16 of the portions 84 of the fold 82 which face each other are bondingly connected via the bonding material 52 disposed on the outer surface 16 of the sleeve 10a. The fold 82 in FIG. 24 is an enlargement of the fold 82 in FIG. 23 for explicitly showing the connection made via the bonding material 52.

It will be understood by one of ordinary skill in the art that when the sleeve 10 is crimped about the outer peripheral surface of the pot that a combination of the types of folds shown in FIGS. 14, 17, 20 and 22, or other folds not shown herein, may be formed in the sleeve 10, for example, the pinch folds 74 of FIG. 20 may alternate with the z-shaped folds 64 or 72 of either or both of FIGS. 14 and 17. It will be further understood that when the sleeve 10a is crimped about the pot 56 that a combination of the types of folds shown in FIGS. 15, 18 and 24 may be formed in the sleeve 10a. Also, the sleeve 10 or 10a may be crimped about the pot 56 in other ways which form folds having configurations not shown herein. Moreover, in another embodiment a sleeve (not shown) may have a bonding material both on the inner surface and outer surface thereof and thus may have any or all of the folds mentioned herein simultaneously.

Changes may be made in the construction and the operation of the various components, elements and assemblies described herein or in the steps or the sequence of steps of the methods described herein without departing from the spirit and scope of the invention as defined in the following claims.

What is claimed is:

1. A method of packaging a potted plant, comprising:
   providing a flexible sleeve, the flexible sleeve having a lower end, an upper end, an outer peripheral surface, and an inner peripheral surface surrounding an inner retaining space for enclosing a pot and an adhesive or cohesive bonding material disposed upon a portion of at least one of the outer peripheral surface and the inner peripheral surface of the lower portion of the sleeve;
   disposing a pot containing a floral grouping into the inner retaining space of the flexible sleeve wherein the flexible sleeve is positioned adjacent an outer peripheral surface of the pot; and
   forming folds in the portion of the sleeve having the bonding material thereby forming in the sleeve a crimped portion having overlapping connected folds and wherein the crimped portion is formed such that the sleeve is substantially free from being bondingly connected to the outer peripheral surface of the pot by the bonding material.

2. The method of claim 1 wherein in the step of providing the flexible sleeve, the flexible sleeve comprises a flattened body comprising:
   a first side having a first edge, a second edge, an upper edge, a lower edge, an outer surface and an inner surface;
   a second side having a first edge, a second edge, an upper edge, a lower edge, an outer surface and an inner surface;
   and wherein in a flattened condition of the sleeve, the inner surface of the first side rests flatwise upon the inner surface of the second side and the first edge of the first side is sealed to the first edge of the second side and the second edge of the first side is sealed to the second edge of the second side.

3. The method of claim 1 wherein in the step of providing the flexible sleeve, the flexible sleeve further comprises a release material disposed on the bonding material which is removed from the sleeve prior to forming a crimped portion in the sleeve.

4. The method of claim 1 wherein in the step of providing the sleeve the bonding material is a cohesive material disposed on the inner peripheral surface of the sleeve.

5. The method of claim 1 wherein in the step of providing the sleeve the bonding material is a cohesive or adhesive material disposed on the outer peripheral surface of the sleeve.

6. The method of claim 1 wherein in the step of providing a flexible sleeve, the flexible sleeve further comprises:
   a lower portion having the inner retaining space, and
   an upper portion connected to the lower portion and sized to substantially surround and encompass the floral grouping, the upper portion detachable from the lower portion via detaching means, and wherein when the pot is disposed within the inner retaining space the lower portion of the flexible sleeve is positioned adjacent the outer peripheral surface of the pot and the upper portion of the sleeve extends upwardly from the pot, said upper portion substantially surrounding and encompassing the floral grouping.

7. The method of claim 1 wherein in the step of providing the flexible sleeve the sleeve has a cylindrical shape.

8. The method of claim 1 wherein in the step of providing the flexible sleeve the sleeve has a shape which is tapered from the upper end to the lower end.

9. The method of claim 1 wherein in the step of providing the flexible sleeve the portion of the sleeve surrounding the pot is oversized in comparison to the size of the pot to be disposed therein.

10. The method of claim 1 wherein in the step of providing the flexible sleeve, the lower end of the sleeve is closed.

11. The method of claim 10 wherein in the step of providing the flexible sleeve the closed lower end comprises a gusset.

12. A method of packaging a potted plant, comprising:
   providing a flexible sleeve, the flexible sleeve having a lower end, an upper end, an outer peripheral surface, and an inner peripheral surface surrounding an inner retaining space for enclosing a pot and an adhesive or cohesive bonding material disposed upon a portion of at least one of the outer peripheral surface and the inner peripheral surface of the lower portion of the sleeve;
   disposing a pot containing a floral grouping into the inner retaining space of the flexible sleeve wherein the flexible sleeve is positioned adjacent an outer peripheral surface of the pot; and
   forming folds in the portion of the sleeve having the bonding material thereby forming in the sleeve a crimped portion having overlapping connected folds.

13. A method of packaging a potted plant, comprising:
   providing a flexible sleeve, the flexible sleeve having a lower end having a gusset therein, an upper end, an outer peripheral surface, and an inner peripheral surface surrounding an inner retaining space for enclosing a pot and an adhesive or cohesive bonding material disposed upon a portion of at least one of the outer peripheral surface and the inner peripheral surface of the lower portion of the sleeve;
   disposing a pot containing a floral grouping into the inner retaining space of the flexible sleeve wherein the flexible sleeve is positioned adjacent an outer peripheral surface of the pot; and
   forming folds in the portion of the sleeve having the bonding material thereby forming in the sleeve a crimped portion having overlapping connected folds.

* * * * *

UNITED STATES PATENT AND TRADEMARK OFFICE
CERTIFICATE OF CORRECTION

PATENT NO.  : 5,829,225
DATED       : November 3, 1998
INVENTOR(S) : Donald E. Weder et al.

It is certified that error appears in the above-identified patent and that said Letters Patent is hereby corrected as shown below:

Drawings,

Fig. 2A, please add the numerals -- 10 -- and -- 36 -- and each associated lead line, as shown.

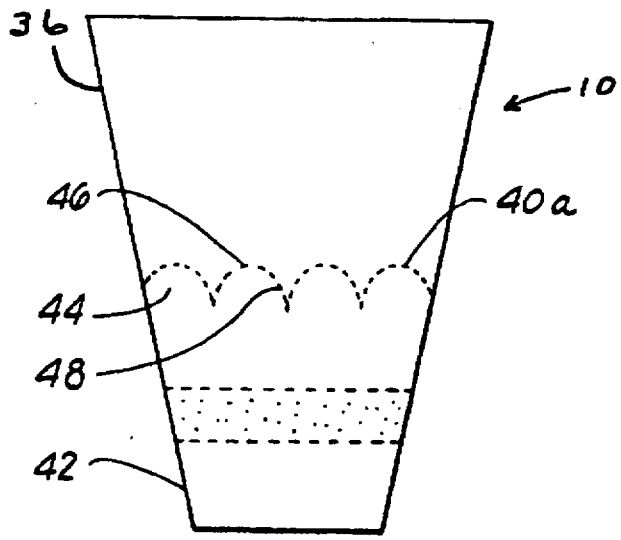

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Fig. 2B, please add the numeral -- 10 -- and its associated lead line, as shown.

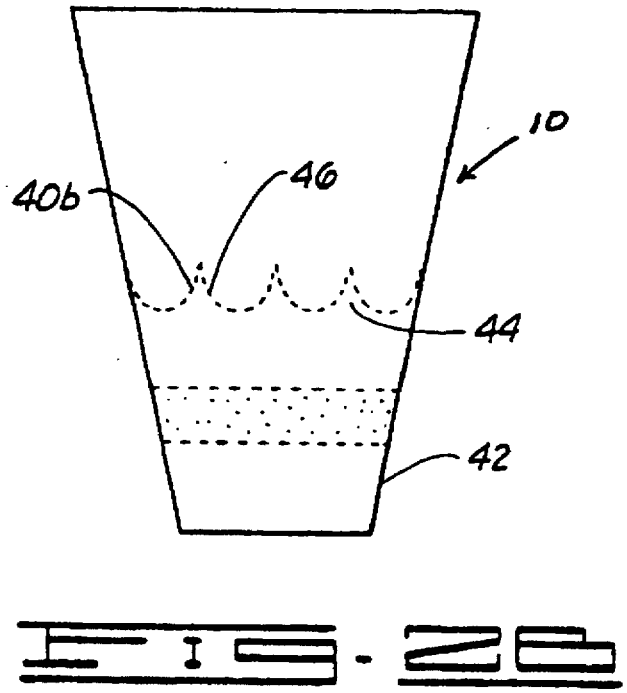

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Fig. 2C, please add the numeral -- 10 -- and its associated lead line, as shown.

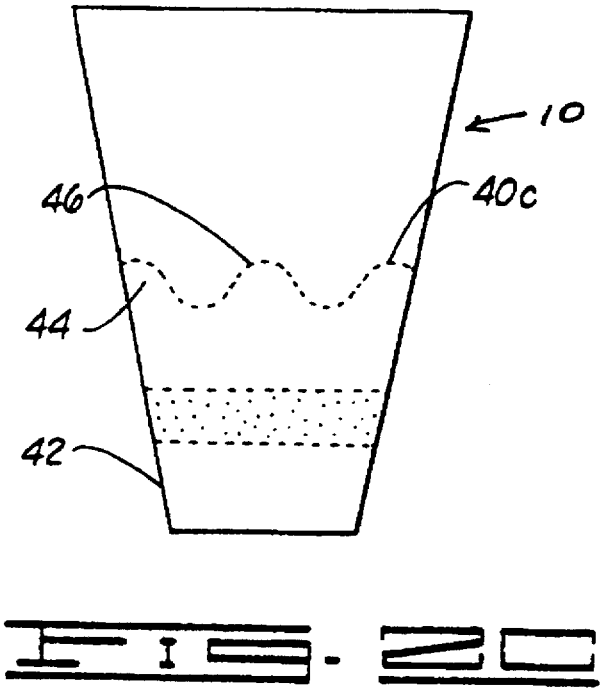

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Fig. 2D, please add the numeral -- 10 -- and its associated lead line, as shown.

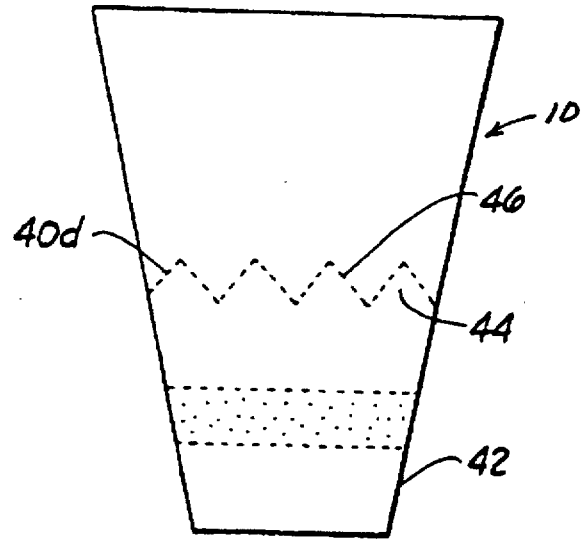

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Fig. 2E, please add the numeral -- 10 -- and its associated lead line, as shown.

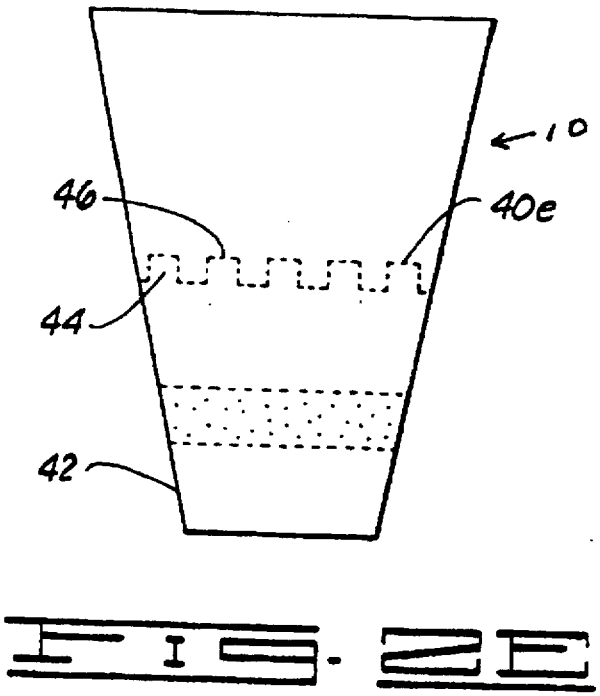

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Fig. 2F, please add the numeral -- 10 -- and its associated lead line, as shown.

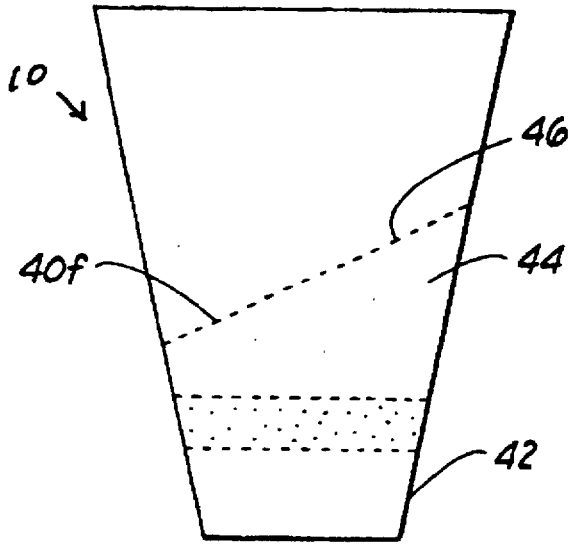

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Fig. 4, please add the numerals -- 28 -- and -- 30 -- and each associated lead line, as shown.

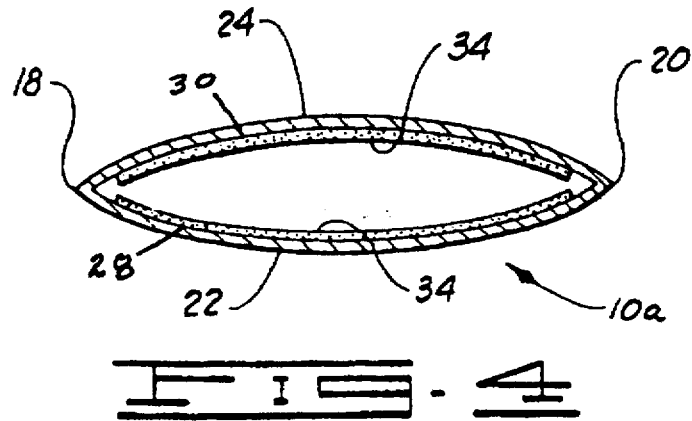

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Fig. 6, please delete the numeral "28" and substitute -- 30 -- thereof; and please delete the numeral "30" and substitute -- 28 -- thereof.

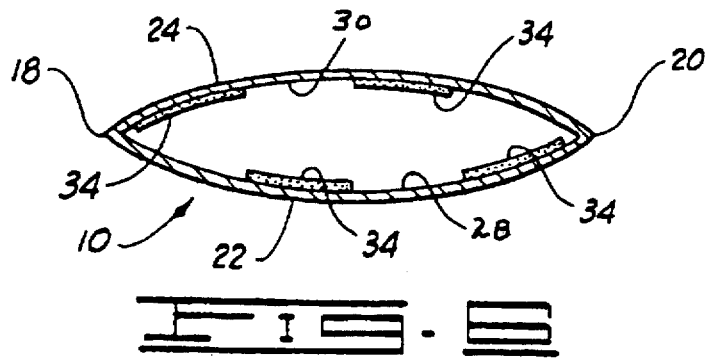

UNITED STATES PATENT AND TRADEMARK OFFICE
CERTIFICATE OF CORRECTION

PATENT NO.   : 5,829,225
DATED        : November 3, 1998
INVENTOR(S)  : Donald E. Weder et al.

It is certified that error appears in the above-identified patent and that said Letters Patent is hereby corrected as shown below:

Fig. 12, please add the numeral -- 38 -- and its associated lead line, as shown.

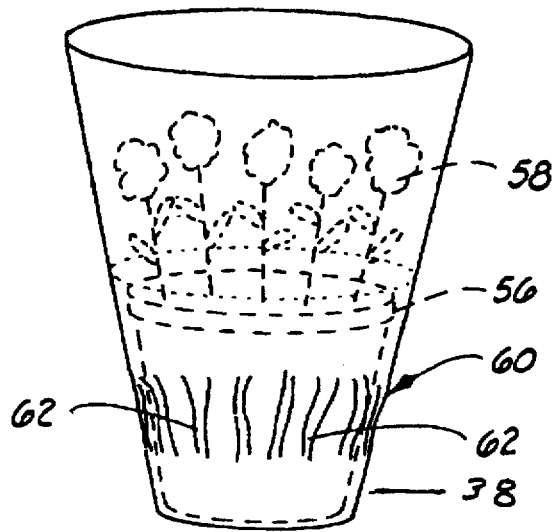

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Fig. 24, please delete the numeral "10" and substitute -- 10a -- therefor

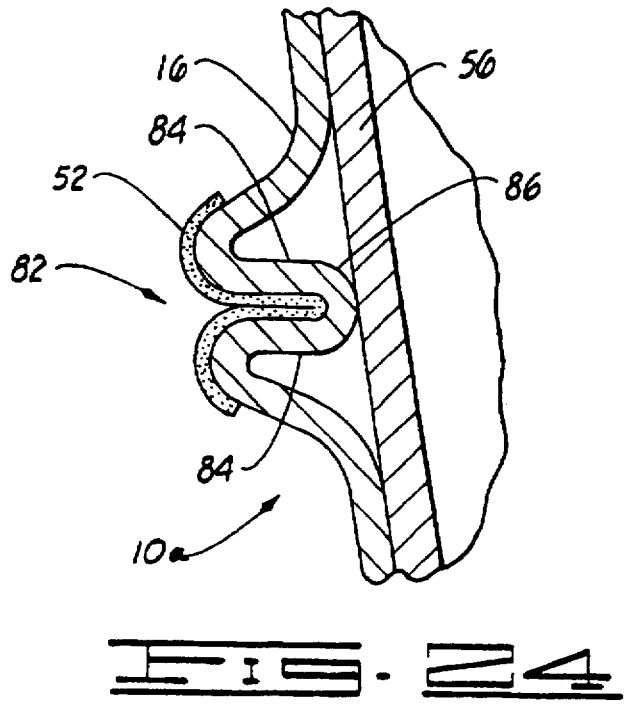

FIG. 24

UNITED STATES PATENT AND TRADEMARK OFFICE
CERTIFICATE OF CORRECTION

PATENT NO.   : 5,829,225
DATED        : November 3, 1998
INVENTOR(S)  : Donald E. Weder et al.

It is certified that error appears in the above-identified patent and that said Letters Patent is hereby corrected as shown below:

Column 2,
Delete "5,315,782   5/1994  Avot et al................47/72" and substitute therefor;
-- 5,315,785   5/1994  Avot et al................47/72 --

Column 1,
Line 49, delete "side to";
Line 51, delete "sectional" and substitute -- cross-sectional -- therefor ;
Line 53, delete "sectional" and substitute -- cross-sectional -- therefor;
Line 55, delete "sectional" and substitute -- cross-sectional -- therefor ;
Line 61, delete "top sectional" and substitute -- cross-sectional -- therefor ;
Line 63, delete "top sectional" and substitute -- cross-sectional -- therefor ;

Column 3,
Line 60, delete "24." and substitute -- 24 (FIG. 3). -- therefor;

Column 4,
Line 3, delete "gussets," and substitute -- gussets 26, -- therefor;
Line 7, after "gusset" and before "may" insert -- 26 --;
Line 20, after "sleeve" and before "is" insert -- 10 --;
Line 22, after "sleeve" and before "adjacent" insert -- 10 --;

Column 6,
Line 12, delete "the" and substitute -- The -- therefor;

Column 7,
Line 35, after "portion" and before "to" insert -- 38 --;
Line 38, delete "sleeve." and substitute -- sleeve 10. -- therefor;
Line 40, after "end" and before "thereof" insert -- 12 --;

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Column 8,
Line 3, after "portions" and before "for" insert -- 36, 38 --;
Line 4, after "sleeve" insert -- 10 --;
Line 7, after "when" and before "detached" insert -- the upper portion 36 is --;
Line 13, delete "of a sleeve" and substitute -- 36 of a sleeve 10 -- therefor;
Line 14, after portion" and before "wherein" insert -- 38 --;
Line 15, after "sleeve" and before "having" insert -- 10 --;
Line 17, after "sleeve" and before "which" insert -- 10 --;
Line 19, after "sleeve" insert -- 10 --;
Line 22, after "sleeve" and before "which" insert -- 10 --;
Line 24, after "sleeve" and before "which" insert -- 10 --;
Line 26, after "sleeve" and before "having" insert -- 10 --;
Line 48, delete "40" and substitute therefor -- 40a -- ;
Line 50, delete "40" and substitute therefor -- 40a -- ;

Column 9,
Line 22, delete "and or" and substitute -- and/or -- therefor;
Line 24, delete "28," and substitute -- 28 and/or 30, -- therefor;
Line 26, after "surface" and before "of" insert -- 28 and/or 30, --;
Line 31, delete "sleeves." and substitute -- sleeves 10. -- therefor;
Line 35, after "surface" and before "of" insert -- 28 or 30 --;
Line 38, after "surface" and before "of" insert -- 28 or 30 --;
Line 44, after "surface" and before "it" insert -- 28 or 30 --;
Line 45, after "sleeve" and before "is" insert -- 10 --;
Line 53, delete "surfaces, the" and substitute -- surfaces 28 or 30. The -- therefor;
Line 54, after "surface" and before "as" insert -- 28 or 30 --;
Line 55, delete "surface." and substitute -- surface 28 or 30. -- therefor;
Line 64, delete "sectional plan" and substitute therefor -- cross-sectional --;
Line 64, delete "10" and substitute therefor -- 10a --;

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Column 10,
Line 1, delete "sleeve." and substitute -- sleeve 10a. -- therefor;
Line 2, delete "side" and substitute -- first or second edge 18 or 20 -- therefor ;
Line 2, delete "10" and substitute therefor -- 10a --;
Line 3, delete "other." and substitute -- other edge 18 or 20. -- therefor ;
Line 4, delete "side to the other." and substitute -- first or second edge 18 or 20 to the other edge 18 or 20. --;
Line 14, after "52" and before "disposed" insert -- is --;
Line 16, delete "10." and substitute therefor -- 10a. --;
Line 17, after "space" and before "of" insert -- 32 --;
Line 30, delete "sectional plan" and substitute therefor -- cross-sectional --;
Line 33, delete "edge 18 to" and substitute -- first edge 18 to second --;
Line 35, delete "side 18 to side 20." and substitute -- first edge 18 to second edge 20. -- therefor;
Line 42, delete "sleeve," and substitute -- sleeve 10 or 10a, -- therefor ;
Line 45, delete "sleeve." and substitute -- sleeve 10 or 10a. -- therefor ;
Line 50, delete "68";
Line 52, delete "sleeve." and substitute -- sleeve 10 or 10a. -- therefor;
Line 54, delete "sleeve." and substitute -- sleeve 10 or 10a -- therefor;
Line 55, delete "sleeve." and substitute -- sleeve 10 or 10a, -- therefor;
Line 56, delete "sleeves." and substitute -- sleeves 10 or 10a. -- therefor;
Line 57, delete "10n" and substitute -- 10 or 10a -- therefor;

Column 11,
Line 9, delete "space";
Line 17, delete "adjacent, yet opposite the surface of the pot 56." and substitute therefor -- on the exterior surface of the sleeve 10a. --;
Line 20, delete "said" and substitute -- the -- therefor;
Line 25, after "pot" and before "by" insert -- 56 --;
Line 40, delete "to the pot" and substitute therefor -- 10 or 10a to the pot 56 --;

UNITED STATES PATENT AND TRADEMARK OFFICE
CERTIFICATE OF CORRECTION

PATENT NO. : 5,829,225
DATED : November 3, 1998
INVENTOR(S) : Donald E. Weder et al.

It is certified that error appears in the above-identified patent and that said Letters Patent is hereby corrected as shown below:

Column 11 (continued),
Line 42, after "folds" and before "in" insert -- 64 --;
Line 43, delete "surface" and substitute -- surfaces 28 and 30 -- therefor;
Line 44, after "surface" insert -- 16 --;
Line 54, delete "surface" and substitute --surfaces 28, 30 -- therefor;
Line 61, delete "surface" and substitute --surfaces 28, 30-- therefor;
Line 66, delete "64" and substitute -- 64a -- therefor;

Column 12,
Line 11, after "64" and before "shown" insert -- or 64a --;
Line 11, after "64" (second occurrence), insert -- or 64a --;
Line 21, delete "an" and substitute -- the -- therefor;
Line 22, delete "surface" and substitute -- surfaces 28, 30 --;
Line 32, after "surface" and before "of" insert -- 16 --;
Line 41, delete "surface" and substitute -- surfaces 28, 30 --;
Line 52, delete "surface" and substitute -- surfaces 28, 30 --;
Line 55, delete "shown" and substitute -- show -- therefor;

Column 13,
Line 3, after "pot" delete "that" and substitute -- 56 -- therefor;
Line 5, delete "10, for" and substitute -- 10. For -- therefor;
Line 66, after "the" and before "sleeve" insert -- flexible --; and Column 14,
Line 2, after "the" and before "sleeve" insert -- flexible --.

Signed and Sealed this

Twenty-seventh Day of November, 2001

Attest:

*Nicholas P. Godici*

NICHOLAS P. GODICI
*Attesting Officer*    *Acting Director of the United States Patent and Trademark Office*